United States Patent
Sanada et al.

(10) Patent No.: US 12,421,407 B2
(45) Date of Patent: Sep. 23, 2025

(54) AQUEOUS INK, INK CARTRIDGE AND INK JET RECORDING METHOD

(71) Applicant: CANON KABUSHIKI KAISHA, Tokyo (JP)

(72) Inventors: Mikio Sanada, Kanagawa (JP); Yoshiyuki Kaneko, Kanagawa (JP); Yoshihisa Yamashita, Osaka (JP); Junichi Sakai, Tokyo (JP); Shoichi Takeda, Kanagawa (JP); Hideki Yamakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 17/937,684

(22) Filed: Oct. 3, 2022

(65) Prior Publication Data

US 2023/0108942 A1    Apr. 6, 2023

(30) Foreign Application Priority Data

Oct. 6, 2021 (JP) ................................ 2021-165008
Sep. 13, 2022 (JP) ............................... 2022-145604

(51) Int. Cl.
| | |
|---|---|
| C09D 11/322 | (2014.01) |
| B41J 2/01 | (2006.01) |
| C09D 11/037 | (2014.01) |
| C09D 11/102 | (2014.01) |
| C09D 11/107 | (2014.01) |
| C09D 11/38 | (2014.01) |

(52) U.S. Cl.
CPC ............. *C09D 11/322* (2013.01); *B41J 2/01* (2013.01); *C09D 11/037* (2013.01); *C09D 11/102* (2013.01); *C09D 11/107* (2013.01); *C09D 11/38* (2013.01)

(58) Field of Classification Search
CPC ... C09D 11/322; C09D 11/037; C09D 11/107; C09D 11/102; C09D 11/38; B41J 2/01
See application file for complete search history.

(56) References Cited

U.S. PATENT DOCUMENTS

| | | |
|---|---|---|
| 2004/0024091 A1 | 2/2004 | Yamada |
| 2011/0281032 A1 | 11/2011 | Kagata |
| 2013/0273259 A1 | 10/2013 | Depardieu |
| 2018/0311968 A1 | 11/2018 | Sato |
| 2019/0225826 A1 | 7/2019 | Ingle |
| 2019/0231662 A1 | 8/2019 | Lingoes |
| 2019/0352434 A1 | 11/2019 | Yoshida et al. |

FOREIGN PATENT DOCUMENTS

| | | |
|---|---|---|
| CN | 1681894 A | 10/2005 |
| CN | 1721483 A | 1/2006 |
| CN | 105143365 A | 12/2015 |
| CN | 107254198 A | 10/2017 |
| CN | 108136770 A | 6/2018 |
| CN | 108625188 A | 10/2018 |
| CN | 110023415 A | 7/2019 |
| EP | 3 360 682 A1 | 8/2018 |
| JP | 2009114346 A | 5/2009 |
| JP | 2009191222 A | 8/2009 |
| JP | 2011225867 A | 11/2011 |
| JP | 2012 122028 A | 6/2012 |
| JP | 2016079241 A | 5/2016 |
| JP | 2017521348 A | 8/2017 |
| JP | 2020084072 A | 6/2020 |
| WO | 2018/144181 A1 | 8/2018 |
| WO | 2021/123127 A1 | 6/2021 |

OTHER PUBLICATIONS

Machine English translation of JP 2011-225867, Shimamura et al., Nov. 10, 2011.*

* cited by examiner

*Primary Examiner* — Patrick D Niland
(74) *Attorney, Agent, or Firm* — Canon U.S.A., Inc. IP Division (57) ABSTRACT

An aqueous ink for ink jet recording includes a titanium oxide particle containing titanium oxide, at least part of the surface of the titanium oxide being covered with alumina and silica in specific proportions, in which the titanium oxide particle is dispersed at least by the action of the silica, and the ratio ($\eta_1/\eta_{1,000}$) of the viscosity ($\eta_1$) of the aqueous ink at a shear rate of 1 (1/s) to the viscosity ($\eta_{1,000}$) at a shear rate of 1,000 (1/s) is 1.10 times or less.

19 Claims, 2 Drawing Sheets

AQUEOUS INK, INK CARTRIDGE AND INK JET RECORDING METHOD

BACKGROUND OF THE INVENTION

Field of the Invention

The present disclosure relates to an aqueous ink, an ink cartridge and an ink jet recording method.

Description of the Related Art

In recent years, ink jet recording apparatuses have been widely used for outputting advertisements and exhibits with recording media, such as paper and resin films. For example, in order to express a clear color image even on a transparent recording medium, a white ink is used in combination with a black ink and basic color inks (hereinafter, these may be collectively referred to as a "color ink"). Specifically, a recording method is employed in which a white ink is applied in advance to a portion of a transparent recording medium including a region where an image is to be recorded to perform undercoating treatment, and color inks is applied thereon, or each ink is applied in the reverse order (what is called back printing).

Titanium oxide is widely used as a coloring material for a white ink because it is low in cost and excellent in characteristics, such as whiteness and concealability, required as a white ink. To stably disperse titanium oxide in an aqueous ink, a dispersant is required. However, titanium oxide, which is a metal oxide, has a higher specific gravity than the coloring materials used for the inks of other colors. For this reason, there has been a problem that sedimentation cannot be sufficiently suppressed even when a dispersant is used.

Up to now, a method for suppressing sedimentation by applying a contrivance other than a dispersant has been studied. For example, PCT Japanese Translation Patent Publication No. 2017-521348 discloses a method for producing a dry titanium dioxide product in which a part of a silane coupling agent is covalently bonded to the surface of a titanium oxide particle by surface-treating the titanium oxide particle with silica, then further surface-treating the titanium oxide particle with the silane coupling agent and drying the resulting titanium oxide particle. PCT Japanese Translation Patent Publication No. 2021-512077 discloses an ink composition containing titanium oxide that has been subjected to surface treatment with silica and alumina, a (meth)acrylic acid homopolymer or a salt thereof and a rheology modifier. Japanese Patent Laid-Open No. 2019-44069 discloses an ink composition that contains a pigment containing a powder with a first charge, an ionic polymer with a second charge different from the first charge, and multivalent ion with a first charge.

SUMMARY OF THE INVENTION

The inventors have conducted studies on various properties of an aqueous ink prepared by using the dry titanium dioxide disclosed in PCT Japanese Translation Patent Publication No. 2017-521348 and an aqueous ink prepared using the ink composition disclosed in PCT Japanese Translation Patent Publication No. 2021-512077 and Japanese Patent Laid-Open No. 2019-44069. As a result, it has been found that they were effective in suppressing sedimentation to some extent. However, it has been found however that when ejection was performed using each ink described above, the resulting image had a rough surface, and the ink had an insufficient leveling property. The deterioration of the leveling property remarkably occurred particularly in a highlight portion, that is, an image in which a small amount of ink applied was used.

Accordingly, the present disclosure provides a titanium oxide-containing aqueous ink used for ink jet recording being capable of recording an image with a superior leveling property, an ink cartridge using the aqueous ink, and an ink jet recording method.

One aspect of the present disclosure is directed to providing an aqueous ink for ink jet recording, the aqueous ink containing a titanium oxide particle that contains titanium oxide, at least part of the surface of the titanium oxide being covered with alumina and silica, in which the titanium oxide particle is dispersed at least by the action of the silica, the proportion of the alumina in the titanium oxide particle is 0.50 times or more to 1.00 time or less the proportion of the silica in the titanium oxide particle in terms of a mass ratio, and the ratio ($\eta_1/\eta_{1,000}$) of the viscosity ($\eta_1$) of the aqueous ink at a shear rate of 1 (1/s) to the viscosity ($\eta_{1,000}$) at a shear rate of 1,000 (1/s) is 1.10 times or less.

Further features of the present disclosure will become apparent from the following description of exemplary embodiments with reference to the attached drawings.

DESCRIPTION OF THE EMBODIMENTS

The present disclosure will be described in more detail below with reference to preferred exemplary embodiments. In an embodiment of the present disclosure, when the compound is a salt, the salt is present in an ink in a state of being dissociated into ions, but it is expressed as "the ink contains the salt" for convenience. Titanium oxide and a titanium oxide particle may be simply referred to as a "pigment". An aqueous ink for ink jet recording may be simply referred to as an "ink". Physical property values are ones at room temperature (25° C.) unless otherwise specified. The ink according to an embodiment of the present disclosure is an aqueous ink that contains a water-containing aqueous medium; thus, for the sake of simplicity, the specific gravity is set to 1.00 g/mL.

An inorganic oxide, such as titanium oxide, reacts with water molecules contained in an aqueous medium in an aqueous ink to form a hydroxy group (hereinafter, referred to as a "surface hydroxy group", in some cases) on the surface of the inorganic oxide. For this reason, in an aqueous ink for ink jet recording, an inorganic oxide is typically used in a state in which titanium oxide has been subjected to surface treatment with a different inorganic oxide, such as alumina or silica, in order to further improve the storage stability of the ink while utilizing the formed surface hydroxy group. The surface hydroxy group of a titanium oxide particle has properties unique to the inorganic oxide corresponding to an inorganic compound used for the surface treatment, and the isoelectric point, which is an index of the strength as an acid, differs in accordance with the type of inorganic compound. Accordingly, although titanium oxide itself is an inorganic oxide, the surface of the titanium oxide particle exhibits the properties of the inorganic oxide corresponding to an inorganic compound used for the surface treatment, and the surface charge of the titanium oxide particle strongly depends on the pH of the aqueous medium, the type of surface treating agent and the amount of surface treating agent used.

The inventors have studied the reason why the leveling property was not sufficiently obtained in an image recorded with each ink described in PCT Japanese Translation Patent Publication No. 2017-521348, PCT Japanese Translation Patent Publication No. 2021-512077, or Japanese Patent Laid-Open No. 2019-44069. In an image in which a large amount of ink applied is used, multiple ink dots easily come into contact with each other in a liquid state on a recording medium, and the ink is smoothed while flowing between the dots. Thus, a phenomenon in which the image has a rough surface tends not to occur. In contrast, in an image in which a small amount of ink applied is used, multiple ink dots are less likely to come into contact with each other. In addition, even when multiple ink dots come into contact with each other, in the case of a large time difference between the application operations of the dots to the recording medium, the multiple ink dots are less likely to be connected to each other because, for example, the preceding applied dot starts to dry; thus, the image easily has a rough surface. That is, the deterioration of the leveling property is a problem that is particularly likely to occur in an image such as a highlight portion where a small amount of ink applied is used.

The ink described in PCT Japanese Translation Patent Publication No. 2017-521348, PCT Japanese Translation Patent Publication No. 2021-512077, or Japanese Patent Laid-Open No. 2019-44069 has structural viscosity (pseudoplasticity), in which the viscosity varies with a shear force due to the above-described composition. The pseudoplasticity is caused by a structural change between particles when a non-uniform interaction between the particles occurs. In the ink having pseudoplasticity, a titanium oxide particle forms a non-uniform aggregate in a state where an external force is not applied, thereby increasing the viscosity of the ink. The non-uniform aggregate is eliminated by the application of an external force, thus decreasing the viscosity of the ink. In the case where an image is recorded using the ink, described in PCT Japanese Translation Patent Publication No. 2017-521348, PCT Japanese Translation Patent Publication No. 2021-512077, or Japanese Patent Laid-Open No. 2019-44069, having the above-described properties, when the next dot is immediately overlapped with a dot that has been applied to a recording medium or an adjacent dot is arranged, an external force continues to act on the ink. Thus, it is considered that the structural viscosity is not developed and the viscosity of the ink remains low, making it difficult to affect the leveling property. However, in the case of recording an image in which dots do not easily come into contact with each other, the structural viscosity is developed in the course of slow spreading of ink dots. Due to an increase in viscosity originating from the structural viscosity, the spreading of ink dots is stopped. That is, the dots do not spread, and the leveling between adjacent dots does not occur, thereby resulting in an image having a rough surface.

The inventors have conceived that the leveling property can be improved by suppressing the development of the structural viscosity, and have conducted studies. The inventors have found that the use of an aqueous ink containing titanium oxide whose surface is at least partially covered with alumina and silica in specific proportions improves the leveling property.

That is, the ink according to an embodiment of the present disclosure has the following features: First, a titanium oxide particle is used, the titanium oxide particle containing titanium oxide whose surface is at least partially covered with alumina and silica. The titanium oxide particle is dispersed at least by the action of the silica. The proportion of an aluminum element in the titanium oxide particle is 0.57 times or more to 1.13 times or less the proportion of a silicon element in the titanium oxide particle in terms of a mass ratio, the proportions being obtained by inductively coupled plasma-optical emission spectrometry. That is, the proportion of alumina in the titanium oxide is 0.50 times or more to 1.00 time or less the proportion of silica in the titanium oxide particle in terms of a mass ratio. Moreover, the ratio $(\eta_1/\eta_{1,000})$ of the viscosity $(\eta_1)$ at a shear rate of 1 (1/s) to the viscosity $(\eta_{1,000})$ at a shear rate of 1,000 (1/s) is 1.10 times or less. The inventors speculate that the mechanism by which the leveling property is improved by the above-described configuration is as described below.

The ratio $(\eta_1/\eta_{1,000})$ of the viscosity $(\eta_1)$ of the ink at a shear rate of 1 (1/s) to the viscosity $(\eta_{1,000})$ of the ink at a shear rate of 1,000 (1/s) is 1.10 times or less. The ink satisfying this condition does not easily cause structural viscosity. As a result, a rapid increase in the viscosity of the dot is less likely to occur, and a good leveling property is obtained. When the ratio is more than 1.10 times, an increase in viscosity due to structural viscosity is caused, and a good leveling property is not obtained. The shear rate used to define the viscosity of the ink will be described in detail later.

The titanium oxide particle is surface-treated with alumina and silica. The titanium oxide particle is dispersed at least by the action of silica. The surface charge state of the titanium oxide particle containing titanium oxide covered with alumina and silica varies in accordance with the pH of the ink. In the pH range normally used as an ink, the surface hydroxyl group derived from silica is in a negatively charged state. For this reason, even when the titanium oxide particles approach each other, the aggregation can be suppressed by electrostatic repulsion, and the titanium oxide particles can be stably dispersed.

The proportion of an aluminum element in the titanium oxide particle is 0.57 times or more to 1.13 times or less the proportion of a silicon element in the titanium oxide particle in terms of a mass ratio, the proportions being obtained by inductively coupled plasma-optical emission spectrometry. That is, regarding the proportions of alumina and silica calculated by converting the resulting values of the elements on the basis of their oxides, the proportion of alumina in the titanium oxide particle is 0.50 times or more to 1.00 time or less the proportion of silica in the titanium oxide particle in terms of a mass ratio. It was found that when the mass ratio is less than 0.50 times, the leveling property is affected. When the mass ratio is more than 1.00 time, the proportion of the alumina is too large. The surface hydroxy group derived from alumina is positively charged and thus acts electrostatically with the negative charge of the surface hydroxy group derived from silica, failing to provide a stably dispersed state. Thereby, a good leveling property is not obtained.

Aqueous Ink

The ink according to an embodiment of the present disclosure is an aqueous ink for ink jet recording, the aqueous ink containing a titanium oxide particle covered with specific inorganic oxides in specific proportions. This ink can be a white ink because titanium oxide is a white pigment. The following is a detailed description of the components contained in the ink according to an embodiment of the present disclosure, the physical properties of the ink and so forth.

Coloring Material

The ink contains, as a coloring material (pigment), a titanium oxide particle containing titanium oxide subjected to surface treatment with a specific inorganic oxide. That is, the ink contains titanium oxide particle containing titanium oxide whose surface is covered with a specific inorganic oxide. The titanium oxide particle content of the ink is preferably 0.10% by mass or more to 20.00% by mass or less based on the total mass of the ink. Moreover, the titanium oxide particle content of the ink can be 1.00% by mass or more to 20.00% by mass or less based on the total mass of the ink. In particular, the titanium oxide particle content of the ink can be 1.00% by mass or more to 15.00% by mass or less based on the total mass of the ink.

Titanium oxide is a white pigment and has three crystal forms: rutile, anatase and brookite. Of these, rutile-type titanium oxide can be used. Industrial production methods for titanium dioxide include a sulfuric acid method and a chlorine method. Titanium oxide used in an embodiment of the present disclosure may be produced by any production method.

The 50% cumulative particle size (hereinafter, also referred to as an "average particle size") of the titanium oxide particle on a volume basis is preferably 200 nm or more to 500 nm or less. In particular, the 50% cumulative particle size of the titanium oxide particle on a volume basis is more preferably 200 nm or more to 400 nm or less. The 50% cumulative particle size ($D_{50}$) of the titanium oxide particle on a volume basis is a particle diameter at a cumulative volume of 50% when integrated from the small particle size side based on the total volume of the measured particles in a cumulative particle size curve. The $D_{50}$ of titanium oxide can be measured, for example, under the conditions of SetZero: 30 seconds, number of measurements: 3 times, measurement time: 180 seconds, shape: non-spherical, refractive index: 2.60. As a particle size distribution measurement apparatus, a particle size analyzer based on a dynamic light scattering method can be used. Of course, the measurement conditions and the like are not limited to those described above.

Titanium oxide subjected to surface treatment with alumina and silica is used. Surface treatment should suppress photocatalytic activity and improve dispersibility. In this specification, "alumina" is a generic term for oxides of aluminum, such as aluminum oxide. In this specification, "silica" is a generic term for silicon dioxide and substances composed of silicon dioxide. Most of the alumina and silica covering the titanium oxide are present in the form of aluminum oxide and silicon dioxide.

The proportion of titanium oxide in the titanium oxide particle can be 90.00% by mass or more based on the total mass of the titanium oxide particle. The proportion of titanium oxide in the titanium oxide particle can be 98.50% by mass or less based on the total mass of the titanium oxide particle. The proportion of alumina in the titanium oxide particle needs to be 0.50 times or more to 1.00 time or less the proportion of silica in the titanium oxide particle in terms of a mass ratio. The proportion of alumina on the titanium oxide particle can be 0.50% by mass or more to 4.00% by mass or less based on the total mass of the titanium oxide particle. The proportion of silica in the titanium oxide particle can be 1.00% by mass or more to 4.00% by mass or less based on the total mass of the titanium oxide particle. When the proportion of the silica is within the above range, the electrostatic repulsive force of a negative charge due to the silica-derived surface hydroxy group can be obtained. Moreover, even when a silane compound described below is used, the reactivity with the silane compound is appropriately adjusted, and the aggregation of the titanium oxide particle can be further suppressed. This can further improve the dispersion stability of the titanium oxide particle. Thus, the leveling property can be further improved.

As a method of measuring the proportions of alumina and silica in the titanium oxide particle, that is, the coating amounts of alumina and silica, for example, quantitative analysis of aluminum and silicon elements by inductively coupled plasma (ICP) optical emission spectrometry can be performed. In this case, calculation can be performed by assuming that all atoms covering the surface are in the form of oxides and converting the obtained aluminum and silicon values into their oxides, i.e., alumina and silica. The proportion of the aluminum element in the titanium oxide particle can be 0.57 times or more to 1.13 times or less the proportion of the silicon element in the titanium oxide particle in terms of a mass ratio, the proportions being obtained by inductively coupled plasma-optical emission spectrometry. When these values are converted on the basis of their oxides, i.e., alumina and silica, the proportion of alumina in the titanium oxide particle is 0.50 times or more to 1.00 time or less the proportion of silica in the titanium oxide particle in terms of a mass ratio.

Examples of a surface treatment method of titanium oxide include wet treatment and dry treatment. For example, the surface treatment can be performed by dispersing titanium oxide in a liquid medium and then allowing the titanium oxide to react with a surface treating agent, such as sodium aluminate and sodium silicate. The surface treatment can be adjusted to desired characteristics by appropriately changing the proportions of the surface treating agents. In addition to alumina and silica, inorganic oxides, such as zinc oxide and zirconia, and organic substances, such as polyols, can be used for the surface treatment as long as the advantageous effects of the present disclosure are not impaired.

The ink may contain an additional pigment other than titanium oxide as long as the advantageous effects of the present disclosure are not impaired. In this case, a color ink other than a white ink can also be used. The additional pigment content of the ink is preferably 0.10% by mass or more to 5.00% by mass or less, more preferably 0.10% by mass or more to 1.00% by mass or less, based on the total mass of the ink.

Poly(Acrylic Acid)

The ink may contain a poly(acrylic acid). The poly(acrylic acid) content of the ink is preferably 0.01% by mass or more to 0.50% by mass or less, more preferably 0.01% by mass or more to 0.20% by mass or less, based on the total mass of the ink. The poly(acrylic acid) can assist the dispersion of the titanium oxide particle. The poly(acrylic acid) is a compound having a structure in which multiple carboxylic acid groups are attached to every other carbon atom constituting a hydrocarbon chain. Ionization of some carboxylic acid groups in the polyacrylic acid is promoted by the presence of monovalent cations in the ink, and the some carboxylic acid groups are negatively charged. The surface hydroxy group derived from alumina on the titanium oxide particle is positively charged, and the poly(acrylic acid) can be adsorbed on the surface of the titanium oxide particle via the surface hydroxy group derived from alumina. The titanium oxide particle on which the poly(acrylic acid) is adsorbed is negatively charged due to a carboxylic acid group in the poly(acrylic acid) in addition to the surface hydroxy group derived from silica. Thus, the electrostatic repulsive force between the titanium oxide particles can be further increased, and the titanium oxide particles can be stably dispersed. Even when the distance between the titanium oxide particles is reduced due to sedimentation or drying on the recording medium, the reduction of the distance can be suppressed by the presence of the poly(acrylic acid). That is, the poly(acrylic acid) has a function as a spacer. When the poly(acrylic acid) content is less than 0.01% by mass, the amount of poly(acrylic acid) is too small. Thus, the above-described effect is not sufficiently obtained, and an improvement in dispersion stability is not obtained. For this reason, the leveling property is not sufficiently obtained, in some cases. When the poly(acrylic acid) content is more than 0.50% by mass, excess amounts of poly(acrylic acid) beyond that adsorbed on the titanium dioxide particle and functioning as a spacer are likely to be present in the ink in a free state. Accordingly, salting-out occurs easily to aggregate the titanium oxide particle, thereby failing to obtain sufficient dispersion stability. For this reason, the leveling property is not sufficiently obtained, in some cases.

The poly(acrylic acid) can be suitably used whether it is a commercially available product or a synthesized compound. As a method for synthesizing the poly(acrylic acid), any known synthesis method may be employed. The poly(acrylic acid) can be synthesized, for example, by polymerization of acrylic acid. The carboxylic acid group of poly(acrylic acid) may be in acid or salt form. In the case of a salt form, examples thereof include salts of alkali metals, such as lithium, sodium and potassium, and salts of (organic) ammonium. From the viewpoint of storage stability of the ink, the poly(acrylic acid) can be a salt form of an alkali metal.

The poly(acrylic acid) can have a weight-average molecular weight of 1,500 or more. The poly(acrylic acid) can have a weight-average molecular weight of 2,500 or less. When a weight-average molecular weight of the poly(acrylic acid) is less than 1,500, even if the poly(acrylic acid) is adsorbed on the titanium oxide particle, the poly(acrylic acid) cannot serve as a spacer for suppressing the titanium oxide particles from coming close to each other is weak because of its too small molecular size, failing to lead to an improvement in dispersion stability. For this reason, the leveling property is not sufficiently obtained because of an increase in viscosity due to the aggregation of the titanium oxide particle, in some cases. When a weight-average molecular weight of the poly(acrylic acid) is more than 2,500, the carboxylic acid groups are considered to be adsorbed on the surfaces of the multiple titanium oxide particles because of the too large molecular size of the poly(acrylic acid), thereby causing the multiple titanium oxide particles to be cross-linked with the poly(acrylic acid). Thus, the dispersion stability is not sufficiently obtained, and the leveling property is not sufficiently obtained, in some cases.

The poly(acrylic acid) content can be 0.001 times or more the titanium oxide particle content in terms of a mass ratio. The poly(acrylic acid) content can be 0.010 times or less the titanium oxide particle content in terms of a mass ratio. When the mass ratio is less than 0.001 times, the amount of poly(acrylic acid) is too small with respect to the amount of the titanium oxide particle, and the function of assisting the dispersion of the titanium oxide particle cannot be sufficiently exhibited. Thus, the dispersion stability is not sufficiently obtained, and the leveling property is not sufficiently obtained, in some cases. When the mass ratio is more than 0.010 times, the poly(acrylic acid) is present in a larger amount than can be adsorbed on the titanium oxide particle, and some poly(acrylic acid) molecules are easily present in a free form in the ink. Thus, salting-out occurs easily to cause the aggregation of the titanium oxide particle, easily deteriorating the dispersion stability. For this reason, the leveling property is not sufficiently obtained, in some cases.

Monovalent Cation

The ink may contain a monovalent cation. The term "monovalent cation" used in this specification refers to an alkali metal ion, an ammonium ion and organic ammonium, and does not include a proton ($H^+$). The ink can contain an alkali metal ion. In particular, the ink can contain a potassium ion. The total monovalent cation content of the ink is preferably 500 ppm or more based on the total mass of the ink. The total monovalent cation content of the ink is more preferably 700 ppm or more based on the total mass of the ink. The total monovalent cation content of the ink is preferably 1,300 ppm or less based on the total mass of the ink. When the total content is less than 500 ppm, the amount of ionic components in the ink is insufficient. Ionization of the surface hydroxy group of the titanium oxide particle is not sufficiently promoted. Thus, the electrostatic repulsive force between the titanium oxide particles is insufficient, in some cases. For this reason, the dispersion stability is not sufficiently obtained, and the leveling property is not sufficiently obtained, in some cases. When the total content is more than 1,300 ppm, the amount of ionic components in the ink is excessively increased, and the aggregation of the particles is caused by salting-out. Thus, the dispersion stability is not sufficiently obtained, and the leveling property is not sufficiently obtained, in some cases. When the ink contains a cation having a valence of two or higher, the cation content can be 10 ppm or less based on the total mass of the ink. The ink need not contain a cation with a valence of two or higher. The total monovalent cation content of the ink can be measured, for example, by quantifying the amounts of various monovalent cations contained by ICP optical emission spectrometry or ion chromatography.

Compound Represented by Formula (1)

The titanium oxide particle in the ink is dispersed at least by the action of silica. The dispersion is further assisted by poly(acrylic acid) that can be added to the ink. In addition to these, a component that assists the dispersion of the titanium oxide particle may be contained. Examples of such a component include a compound represented by the following formula (1). The amount of compound represented by formula (1) contained in the ink is preferably 0.01% by mass or more to 1.00% by mass or less, more preferably 0.02% by mass or more to 0.50% by mass or less, based on the total mass of the ink. The amount of compound represented by formula (1) contained in the ink can be 0.002 times or more to 0.10 times or less the amount of the titanium oxide particle contained in the aqueous ink in terms of a mass ratio.

A subset of one or more OR' groups attached to the silicon atom in the compound represented by formula (1) is partially hydrolyzed in an aqueous medium to form a silanol group. Thus, the dispersant has an affinity for the silica-derived surface hydroxy group on the surface of the titanium oxide particle. The compound represented by formula (1) has, in addition to the moiety capable of forming a silanol group as described above, another moiety, serving as a repeating unit, ((OR$_4$)$_n$ in formula (1)) including n alkylene oxide groups each having 2 to 4 carbon atoms via X serving as a linking group. Hereinafter, the above moiety is also referred to as an "alkylene oxide chain". The alkylene oxide chain is hydrophilic. Thus, the alkylene oxide chain extends moderately in an aqueous medium and exhibits a repulsive force due to steric hindrance. Accordingly, the compound represented by formula (1) is effective in assisting the dispersion of the titanium oxide particle, where in formula (1), $R_1$, $R_2$ and $R_3$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

In formula (1), $R_1$, $R_2$ and $R_3$ are each independently a hydrogen atom or an alkyl group having 1 to 4 carbon atoms. Examples of the alkyl group having 1 to 4 carbon atoms include a methyl group, an ethyl group, a n-propyl group, an i-propyl group and a n-butyl group. Among these, a methyl group can be used from the viewpoint of ease of hydrolysis. When each of $R_1$, $R_2$ and $R_3$ is an alkyl group having more than 4 carbon atoms, the compound is not easily hydrolyzed to form a silanol group, thereby failing to obtain an affinity for the titanium oxide particle. Thus, the titanium oxide particle cannot be stably dispersed, and the leveling property is not sufficiently obtained, in some cases. Here, a representing the number of $R_1O$ is 1 to 3, b representing the number of $R_2$ is 0 to 2 and a+b=3. In particular, a can be 3, and b can be 0, that is, all three substituents on the silicon atom can be $R_1O$.

In formula (1), each $R_4$ is independently an alkylene group having 2 to 4 carbon atoms. Examples of the alkylene group having 2 to 4 carbon atoms include an ethylene group, a n-propylene group, an i-propylene group and n-butylene group. In particular, an ethylene group can be used. The number of OR$_4$, that is, n (average value) representing the number of an alkylene oxide group is 6 to 24. When n is less than 6, the length of the alkylene oxide chain is too short, and a repulsive force due to steric hindrance is not sufficiently obtained, failing to sufficient dispersion stability. Thus, the leveling property is not sufficiently obtained, in some cases. When n is more than 24, the length of the alkylene oxide chain is too long, so that the compound has higher hydrophilicity and is more likely to be present in free form in an aqueous medium. Thus, an affinity for the silica-derived surface hydroxy group of the titanium oxide particle cannot be sufficiently obtained, and the aggregation of the titanium oxide particle is not efficiently suppressed, in some cases. Thus, the dispersion stability is not sufficiently obtained, and the leveling property is not sufficiently obtained, in some cases.

In formula (1), X is a single bond or an alkylene group having 1 to 6 carbon atoms. When X is a single bond, it means that the silicon atom and OR$_4$ are directly bonded to each other. Examples of the alkylene group having 1 to 6 carbon atoms includes a methylene group, an ethylene group, a n-propylene group, an i-propylene group, a n-butylene group, a n-pentylene group and a n-hexylene group. In particular, a n-propylene group can be used. When X is an alkylene group having more than 6 carbon atoms, the hydrophobicity of the compound represented by formula (1) is too high, and the effect of stably dispersing the titanium oxide particle is weak; thus, the leveling property is not sufficiently obtained, in some cases.

The compound represented by formula (1) can be a compound represented by the following formula (2). The compound represented by formula (2) has three OR' groups attached to the silicon atom. Thus, the compound can be partially hydrolyzed in an aqueous medium to form three hydroxy groups attached to the silicon atom, thereby making it possible to increase portions each having an affinity for the titanium oxide particle. In addition, the compound represented by the following formula (2) has repeating units of an ethylene oxide group. Thus, the ethylene oxide chain is appropriately elongated in an aqueous medium, and a repulsive force due to steric hindrance can be obtained, where in formula (2), $R_1$ and $R_3$ are each independently a hydrogen atom or an alkyl group having 1 to 4 carbon atoms, and m is 8 to 24.

Resin

The ink can contain a resin. Examples of the resin include acrylic resins, urethane resins and urea resins. In particular, an acrylic resin can be used. The resin content of the ink is preferably 1.00% by mass or more to 25.00% by mass or less, more preferably 3.00% by mass or more to 15.00% by mass or less, even more preferably 5.00% by mass or more to 15.00% by mass or less, based on the total mass of the ink.

The resin can be contained in the ink for the purpose of improving various properties of recorded images, such as scratch resistance and concealability. Examples of the form of the resin include a block copolymer, a random copolymer, a graft copolymer and a combination of these copolymers. Moreover, the resin may be a water-soluble resin that is soluble in an aqueous medium, or may be a resin particle that is dispersed in an aqueous medium. The water-soluble resin may prevent dispersion due to the action of silica; thus, the resin particle can be used. As described below, when the water-soluble resin is added to the ink, the water-soluble resin content can be low. The resin particle need not contain a coloring material.

In this specification, the "water-soluble resin" means that when the resin is neutralized with an alkali in an amount equivalent to the acid value of the resin, the resin is present in an aqueous medium in a state in which a particle whose particle size can be measured by a dynamic light scattering method is not formed. Whether the resin is soluble in water can be determined in accordance with the following method: First, a liquid (resin solid content: 10% by mass) containing a resin neutralized with an alkali (for example, sodium hydroxide or potassium hydroxide) equivalent to the acid value is prepared. The prepared liquid is diluted to 10 times (on a volume basis) with deionized water to prepare a sample solution. Then, when the particle size of the resin in the sample solution is measured by a dynamic light scattering method, if a particle having a particle size is not measured, the resin can be determined to be soluble in water. The measurement conditions at this time can be set as follows: for example, SetZero: 30 seconds, the number of measurements: 3 times and the measurement time: 180 seconds. As the particle size distribution measurement apparatus, for example, a particle size analyzer by a dynamic light scattering method (for example, trade name "UPA-EX150", available from Nikkiso Co., Ltd.) can be used. Of course, the particle size distribution measurement apparatus and measurement conditions used are not limited to those described above.

The acid value of the water-soluble resin is preferably 80 mgKOH/g or more to 250 mgKOH/g or less, more preferably 100 mgKOH/g or more to 200 mgKOH/g or less. When the resin particle is used, the acid value of the resin particle is preferably 0 mgKOH/g or more to 50 mgKOH/g or less. The weight-average molecular weight of the resin is preferably 1,000 or more to 30,000 or less, more preferably 5,000 or more to 15,000 or less. The weight-average molecular weight of the resin is a value measured by gel permeation chromatography (GPC) in terms of polystyrene.

Particle

In the ink, various compounds, such as the titanium oxide particle and the resin particle, are present in a dispersed state. Hereinafter, these compounds are collectively referred to as a "particle". The volume of the particle including the titanium oxide particle dispersed in the aqueous ink is 13.5% by volume or less based on the total volume of the ink. In this specification, the term "particle" is a generic term for compounds that do not dissolve in the liquid medium in the ink but are dispersed in the ink, such as the titanium oxide particle and the resin particle. The volume of the particle in the ink can be simply calculated by dividing the amounts (% by mass) of components in the ink by the specific gravities of the respective components in the ink. The volume of the particle in the ink can also be calculated from the particle size obtained by a particle size measurement device using a dynamic light scattering method or a laser diffraction method. When the volume of the particle in the ink is more than 13.5% by volume, it is difficult to maintain a stable dispersion of the titanium oxide particle, and the dispersion stability is deteriorated. Thus, the leveling property is not sufficiently obtained, in some cases. The volume of the particle including the titanium oxide particle dispersed in the aqueous ink can be 2.5% by volume or more based on the total volume of the ink.

Aqueous Medium

The ink is an aqueous ink containing water as an aqueous medium. The ink can contain water or an aqueous medium that is a mixed solvent of water and a water-soluble organic solvent. As the water, deionized water (ion-exchanged water) can be used. The water content of the ink can be 50.00% by mass or more to 95.00% by mass or less based on the total mass of the ink.

The water-soluble organic solvent is not particularly limited as long as it is water-soluble (it can dissolve in water at any ratio at 25° C.). Specific examples of the water-soluble organic solvent that can be used include monohydric or polyhydric alcohols, alkylene glycols, glycol ethers, nitrogen-containing polar compounds and sulfur-containing polar compounds. The water-soluble organic solvent content of the ink is preferably 3.00% by mass or more to 50.00% by mass or less, more preferably 10.00% by mass or more to 40.00% by mass or less, based on the total mass of the ink. At a water-soluble organic solvent content of less than 3.00% by mass, the ink may stick in an ink jet recording apparatus and may have insufficient sticking resistance. At a water-soluble organic solvent content of more than 50.00% by mass, ink supply failure may occur.

Additional Additive

In addition to the above-described additives, the ink may contain various additives, such as a surfactant, a pH adjuster, a rust preventive, a preservative, an antifungal agent, an antioxidant, a reducing inhibitor, an evaporation promoter and a chelating agent, as needed. In particular, the ink can contain a surfactant. The surfactant content of the ink is preferably 0.10% by mass or more to 5.00% by mass or less, more preferably 0.10% by mass or more to 2.00% by mass or less, based on the total mass of the ink. Examples of the surfactant include anionic surfactants, cationic surfactants and nonionic surfactants. Among these, a nonionic surfactant that has a low affinity for titanium oxide particle and that is effective even in a small amount can be used because the surfactant is used to adjust various physical properties of the ink.

Physical Properties of Ink

The ratio ($\eta_1/\eta_{1,000}$) of the viscosity ($\eta_1$) of the ink at a shear rate of 1 (1/s) to the viscosity ($\eta_{1,000}$) of the ink at a shear rate of 1,000 (1/s) is 1.10 times or less. In the range of the viscosity suitable for the aqueous ink for ink jet recording, it can be said that the viscosity in a state at a low shear rate is the viscosity in a state where the movement of the ink is small, and the viscosity in a state at a high shear rate is the viscosity in a state where the movement of the ink is large. In an embodiment of the present disclosure, the viscosity at a shear rate of 1 (1/s), which is a state where the movement of the ink is small, is used to grasp a state where the ink dot spreads on the recording medium. The viscosity at a shear rate of 1,000 (1/s), which is a state in which the movement of the ink is large, is used to grasp a state in which the ink is ejected, for example. An ink having a small ratio of these viscosities does not have structural viscosity. The ratio ($\eta_1/\eta_{1,000}$) of the viscosity ($\eta_1$) of the aqueous ink at a shear rate of 1 (1/s) to the viscosity ($\eta_{1,000}$) at a shear rate of 1,000 (1/s) can be 1.00 time or more.

To achieve a ratio of 1.10 times or less, for example, the following method can be considered. A component that easily causes structural viscosity or pseudoplasticity, such as an alumina particle, is not contained, or if contained, the content is set to very small (less than 0.01% by mass). A water-soluble resin other than poly(acrylic acid) is not contained, or if contained, the content is set to very small (less than 0.01% by mass) because the water-soluble resin may destabilize the dispersion owing to the action of silica. A component, such as polyacrylic acid, capable of canceling the positive charge of alumina on the titanium oxide particle is incorporated. Of course, the present disclosure is not limited to these methods.

The viscosity ($\eta_1$) of the aqueous ink at a shear rate of 1 (1/s) can be 1.0 mPa·s or more to 10.0 mPa·s or less. The viscosity ($\eta_{1,000}$) of the aqueous ink at a shear rate of 1,000 (1/s) can be 1.0 mPa·s or more to 15.0 mPa·s or less. The viscosity of the ink can be measured with, for example, a dynamic viscoelastometer (rheometer). In Examples described below, the viscosity was measured with a rotational shear rheometer (trade name: "DHR-20", available from TA Instruments) using a cone plate having a plate diameter of 60 mm and a cone angle of 1°. An example of measurement conditions in this case is described below. Of course, the present disclosure is not limited to the above-described measurement apparatus or the measurement conditions.

Temperature: 25° C.
Soak time: 10 seconds
Initial sear rate: 0.01 (1/s)→1,000 (1/s)
Points per decade: 20

The ink is used for an ink jet recording method; thus, the physical properties thereof can be appropriately controlled. The surface tension of the ink at 25° C. is preferably 10 mN/m or more to 60 mN/m or less, more preferably 20 mN/m or more to 40 mN/m or less. The surface tension of the ink can be adjusted by appropriately determining the type and content of the surfactant in the ink. The pH of the ink at 25° C. can be 7.0 or more to 9.0 or less.

Ink Cartridge

Figure 1:
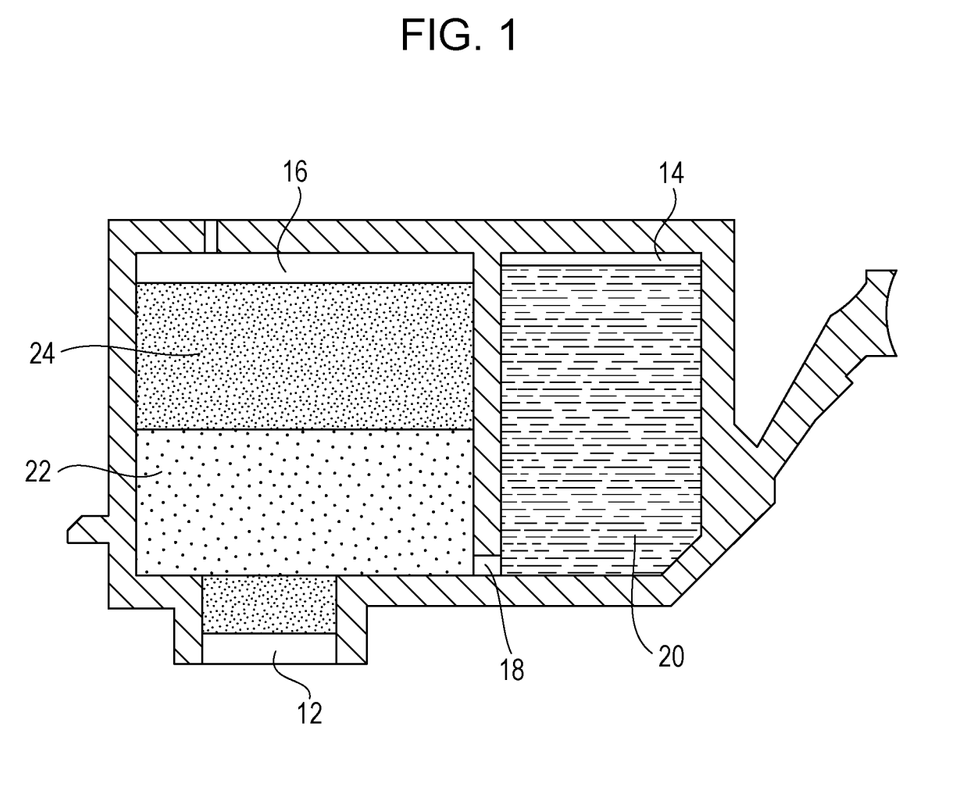
FIG. 1 is a cross-sectional view schematically illustrating an exemplary embodiment of an ink cartridge of the present disclosure.

An ink cartridge according to an embodiment of the present disclosure includes an ink and an ink storage portion storing the ink. The ink contained in this ink storage portion is the above-described aqueous ink (white ink) according to an embodiment of the present disclosure. FIG. 1 is a cross-sectional view schematically illustrating an exemplary embodiment of an ink cartridge of the present disclosure. As illustrated in FIG. 1, an ink supply port 12 for supplying an ink to a recording head is provided on the bottom face of the ink cartridge. The interior of the ink cartridge is an ink storage portion for storing the ink. The ink storage portion includes an ink storage chamber 14 and an absorber storage chamber 16, which communicate with each other through a communication port 18. The absorber storage chamber 16 communicates with the ink supply port 12. The ink storage chamber 14 contains a liquid ink 20. The absorber storage chamber 16 receives absorbers 22 and 24 that hold the ink in an impregnated state. The ink storage portion may be configured to include an absorber that holds the total amount of ink stored without having an ink storage chamber for storing a liquid ink. The ink storage portion does not have an absorber, and may be configured to store the total amount of ink in a liquid state. Furthermore, the ink cartridge may be configured to include an ink storage portion and a recording head.

Ink Jet Recording Method

The ink jet recording method according to an embodiment of the present disclosure is a method for recording an image on a recording medium by ejecting the above-described aqueous ink according to an embodiment of the present disclosure from an ink jet recording head. Examples of a method for ejecting an ink include a method for applying mechanical energy to an ink and a method for applying thermal energy to an ink. In an embodiment of the present disclosure, a method for ejecting an ink by applying thermal energy to the ink can be employed. Steps included in the ink jet recording method may be the same as known steps, except that the ink according to an embodiment of the present disclosure is used. For example, when an image is recorded with the white ink, the method can be employed to a general-purpose ink jet recording method as it is. When undercoating treatment for a color ink is performed with the white ink, an image may be recorded by applying the color ink (for example, an ink of black, cyan, magenta or yellow) so as to overlap at least part of a region to which the white ink is applied. In addition, the undercoating treatment can also be used for back printing in which the white ink is applied so as to overlap at least part of a region to which a color ink is applied. The recording medium is not particularly limited, but since the aqueous ink according to an embodiment of the present disclosure can be used as a white ink, a transparent or colored recording medium can be used. The recording medium may be a poorly absorbable medium (non-absorbable medium), such as a resin film having low liquid medium absorbency.

Figure 2A:
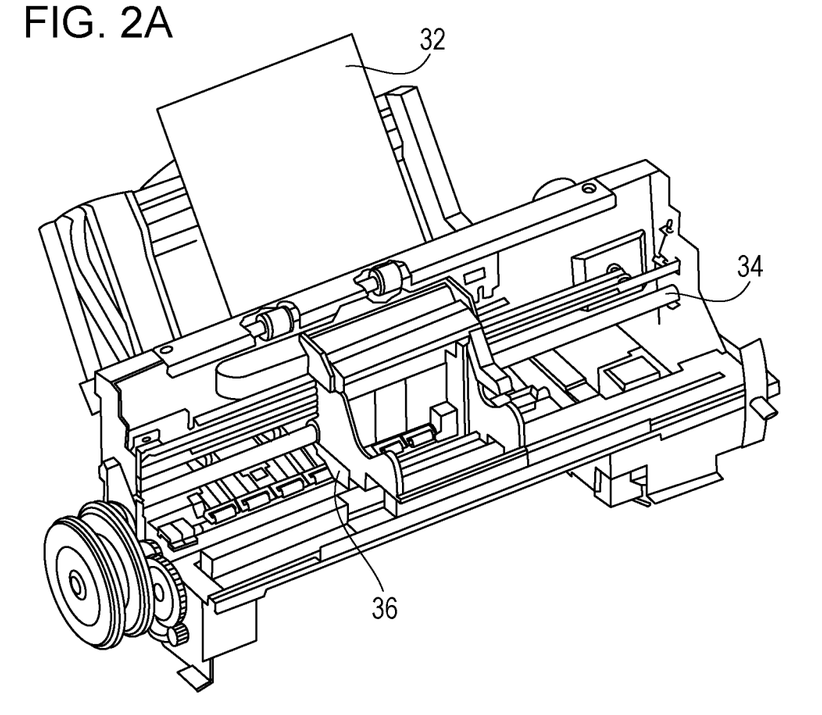
FIG. 2A is a perspective view schematically illustrating an example of a principal part of an ink jet recording apparatus used in an ink jet recording method according to the present disclosure.
Figure 2B:
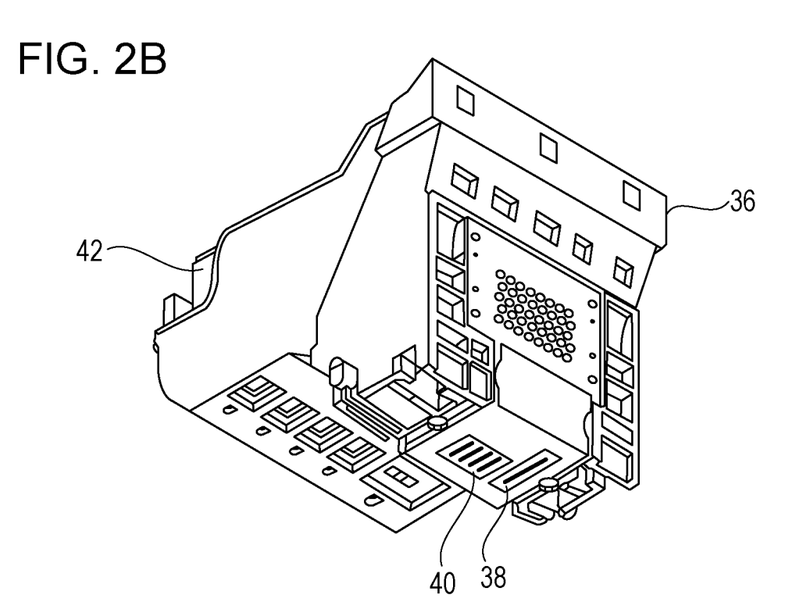
FIG. 2B is a perspective view schematically illustrating an example of a head cartridge used in an ink jet recording method according to the present disclosure.

FIG. 2A is a perspective view schematically illustrating an example of a principal part of an ink jet recording apparatus used in an ink jet recording method according to the present disclosure, and FIG. 2B is a perspective view schematically illustrating an example of a head cartridge used in an ink jet recording method according to the present disclosure. The ink jet recording apparatus includes a conveyance unit (not illustrated) configured to convey a recording medium 32; and a carriage shaft 34. A head cartridge 36 can be mounted on the carriage shaft 34. The head cartridge 36 includes recording heads 38 and 40, and is configured in such a manner that an ink cartridge 42 is set therein. While the head cartridge 36 is conveyed along the carriage shaft 34 in the main scanning direction, an ink (not illustrated) is ejected from the recording heads 38 and 40 toward the recording medium 32. Then the recording medium 32 is conveyed in the sub-scanning direction with a conveyance unit (not illustrated), thereby recoding an image on the recording medium 32.

Multipass recording can be used in which the ink is applied to the unit region of the recording medium in multiple relative scans of the recording heads and the recording medium. In particular, the application of white ink to the unit area and the application of color ink thereto can be performed in different relative scans. This allows more time for the inks to come into contact with each other, and mixing is more likely to be suppressed. The unit region can be set as any region, such as one pixel or one band.

EXAMPLES

Hereinafter, the present disclosure will be described in more detail by way of examples and comparative examples. The present disclosure is not limited to the following examples as long as it is within the scope of the present disclosure. Regarding the amounts of components, "part(s)" and "%" are on a mass basis, unless otherwise specified. A titanium oxide particle dispersion is referred to as a "pigment dispersion liquid".

Preparation of Titanium Oxide

Commercially available titanium oxide particles subjected to surface treatment in advance and titanium oxide particles prepared by subjecting untreated titanium oxide to surface treatment were used. The 50% cumulative particle size ($D_{50}$) of the titanium oxide particles on a volume basis were measured with a particle size analyzer (trade name: "Nanotrac WaveII-EX150", available from MicrotracBEL Corp.) by a dynamic light scattering method. Table 1 presents the properties of the titanium oxide particles. In Table 1, TITANIX: JR, JR-403, JR-405 and JR-600A are trade names of rutile-type titanium oxide available from Tayca Corporation. The volume of the titanium oxide particle was calculated by dividing the titanium oxide particle content (% by mass) of the ink by the specific gravity given in Table 1. The specific gravity of the titanium oxide particle is a value measured by subjecting an aqueous dispersion of the titanium oxide particle to a density gradient centrifugation method.

Measurement of Coating Amount of Alumina and Silica

The proportions of alumina and silica on the titanium oxide particle, that is, the coating amounts of alumina and silica were measured as follows: A liquid obtained by adding the prepared titanium oxide particle to nitric acid was used as a sample. Quantitative analysis of aluminum and silicon elements was performed with an inductively coupled plasma (ICP) optical emission spectrometer. At this time, assuming that all the atoms covering the surface of the titanium oxide were in the form of oxides, the obtained values of aluminum and silicon were converted into values on the basis of oxides, that is, alumina and silica, and the mass ratio was calculated.

Titanium Oxide Particles 1, 3, 7 and 9

The surface treatment of titanium oxide was performed by a wet process to produce each titanium oxide particle. In the surface treatment by the wet process, untreated titanium oxide was brought into contact with surface treating agents (for example, sodium aluminate and sodium silicate). In the surface treatment, the amounts and proportions of the surface treating agents used were appropriately adjusted to achieve desired ratios.

Specifically, 300 parts of non-surface-treated rutile-type titanium oxide (trade name: "TITANIX JR", available from Tayca Corporation) and 700 parts of deionized water were mixed using a homogenizer. The temperature was increased to 90° C. while agitating. Potassium hydroxide (pH adjuster) was added to adjust the pH to 10.5. Sodium silicate was added thereto. Dilute sulfuric acid (pH adjuster) was added over about 1 hour to adjust the pH to 5.0. The reaction was continued for about 1 hour. Then sodium aluminate was added at 90° C. in small amounts. To maintain the pH, dilute sulfuric acid was used in combination to maintain the pH at 6.0 or more to 8.0 or less. After the addition of sodium aluminate, the reaction was continued for about 1 hour to obtain a dispersion. The dispersion was cooled to 25° C., purified by repeating sedimentation with a centrifugal separator and re-dispersion in ion-exchanged water and dried at 120° C. to obtain each titanium oxide particle surface-treated with at least one of alumina and silica. Table 1 presents the properties of each titanium oxide particle.

Titanium Oxide Particles 2, 8 and 10

As titanium oxide particles 2, 8, and 10, commercially available titanium oxide particles (including those previously surface-treated with alumina and silica) were used. Table 1 also presents the properties of titanium oxide particles 2, 8 and 10. Some commercially available titanium oxide particles contained inorganic oxides, such as zirconia and zinc oxide, and organic compounds, such as polyol, in addition to alumina and silica, but the proportion thereof was about 1.0% at most. Thus, these were collectively included in the proportion T (%) of titanium oxide in the titanium oxide particle ("Titanium oxide T (%)" in Table 1), for convenience.

TABLE 1

Properties of titanium oxide particle

| Titanium oxide particle | Type | Proportion in titanium oxide particle (%) | | | | | Value of a/s (times) | Value of A/S (times) | $D_{50}$ (nm) | Specific gravity |
| | | Titanium oxide T (%) | Aluminum element a (%) | Alumina A (%) | Silicon element s (%) | Silica S (%) | | | | |
|---|---|---|---|---|---|---|---|---|---|---|
| 1 | Sample prepared by surface-treating "TITANIX JR" (trade name) | 94.9 | 1.1 | 2.0 | 1.4 | 3.1 | 0.73 | 0.65 | 290 | 4.00 |
| 2 | "TITANIX JR-403" (trade name) | 95.7 | 1.1 | 2.0 | 1.1 | 2.3 | 0.98 | 0.87 | 250 | 4.00 |
| 3 | Sample prepared by surface-treating "TITANIX JR" (trade name) | 94.3 | 1.0 | 1.9 | 1.8 | 3.8 | 0.57 | 0.50 | 290 | 4.00 |
| 4 | Sample prepared by surface-treating "TITANIX JR" (trade name) | 96.0 | 1.1 | 2.0 | 0.9 | 2.0 | 1.13 | 1.00 | 290 | 4.00 |
| 5 | Sample prepared by surface-treating "TITANIX JR" (trade name) | 98.5 | 0.0 | 0.0 | 0.7 | 1.5 | 0.00 | 0.00 | 290 | 4.00 |
| 6 | Sample prepared by surface-treating "TITANIX JR" (trade name) | 94.2 | 1.0 | 1.9 | 1.8 | 3.9 | 0.55 | 0.49 | 290 | 4.00 |
| 7 | Sample prepared by surface-treating "TITANIX JR" (trade name) | 95.9 | 1.1 | 2.1 | 0.9 | 2.0 | 1.19 | 1.05 | 290 | 4.00 |
| 8 | "TITANIX JR-405" (trade name) | 99.1 | 0.5 | 0.9 | 0.0 | 0.0 | — | — | 210 | 4.10 |
| 9 | Sample prepared by surface-treating "TITANIX JR" (trade name) | 99.2 | 0.1 | 0.1 | 0.3 | 0.7 | 0.16 | 0.14 | 230 | 4.00 |
| 10 | "TITANIX JR-600A" (trade name) | 98.2 | 1.0 | 1.8 | 0.0 | 0.0 | — | — | 250 | 4.10 |

Preparation of Compound Represented by Formula (1)

The compound represented by formula (1) was synthesized by the following procedure. Synthesis conditions of compounds synthesized as compounds represented by formula (1) and comparative compounds are given in Table 2, and the structures thereof are given in Table 3. The compound represented by formula (1) can be synthesized by allylation and hydrosilylation of a raw material (for example, a polyalkylene glycol monoalkyl ether).

A raw material, a base and a solvent listed in Table 2 were fed into a three-necked flask equipped with a stirring bar and a nitrogen inlet. The mixture was stirred at 25° C. for 30 minutes. As "sodium hydride", a 60% dispersion liquid of sodium hydride in paraffin was used. The dispersion was used so as to achieve the amount of sodium hydride given in Table 2. The mixture was stirred at 25° C. while the bromide described in Table 2 was added dropwise. The stirring was continued for another 12 hours after the completion of the dropwise addition, thereby preparing a mixture containing a reaction product. After unreacted sodium hydride and a neutralized product (sodium bromide) were separated by filtration from the mixture containing the reaction product, THF was removed under reduced pressure to give a concentrate. The concentrate was dissolved in 500 parts of deionized water. This aqueous solution was extracted three times with 200 mL of hexane, and then extracted with 200 mL of dichloromethane. The solvent containing the product was dried over magnesium sulfate and evaporated under reduced pressure to give each allylated compound (allylation step).

The allylated raw material and a silane compound given in Table 2 were fed into a passivated, dry round-bottom flask equipped with a stirring bar and an argon inlet. The mixture was stirred at 85° C. Then, 0.54 parts of a 65 mmol/L solution of chloroplatinic acid monohydrate in isopropyl alcohol and water was added thereto. The mixture was heated at 85° C. for 5 hours. After the completion of the reaction, the mixture was allowed to cool to 25° C. The excess silane compound was removed under reduced pressure. The residue was purified by column chromatography using a silica gel, which had been passivated with triethoxysilane, as a support to obtain each compound (hydrosilylation step). In the purification by the column chromatography, an eluent of ethyl acetate/hexane/ethanol=85/15/5 (volume basis) was used.

Preparation of Pigment Dispersion

Pigment dispersions were produced by the following procedure. The production conditions of the pigment dispersions are given in Table 4.

Pigment Dispersions 1 to 14 and 16 to 18

As given in Table 4, 40.00 parts of the titanium oxide particle, a dispersant, potassium hydroxide and ion-exchanged water used in an amount such that the total amount of components was 100.00 parts were mixed. Preliminary dispersion treatment was performed with a homogenizer. The amount of potassium hydroxide used was appropriately adjusted to achieve a pH of 10.5 in the main dispersion. The pH of the main dispersion was a value measured with a pH meter (trade name: "Portable pH Meter D-74", available from Horiba, Ltd.) at the time when the main dispersion treatment was started. Thereafter, dispersion treatment (main dispersion treatment) was performed at 25° C. for 12 hours with a paint shaker using 0.5-mm zirconia beads. The zirconia beads were separated by filtration. An appropriate amount of ion-exchanged water was added as necessary to

TABLE 2

Synthesis conditions of compound represented by formula (1)

| | Allylation step | | | | | | | | Hydrosilylation step | |
| --- | --- | --- | --- | --- | --- | --- | --- | --- | --- | --- |
| | Raw material | | Base | | Solvent | | Bromide | | Allylated raw material | Silane compound | |
| Compound | Type | Amount used (parts) | Type | Amount used (parts) | Type | Amount used (parts) | Type | Amount used (parts) | Amount used (parts) | Type | Amount used (parts) |
| 1 | polyethylene glycol monomethyl ether (n = 10) | 28.3 | sodium hydride | 2.9 | THF | 200 | allyl bromide | 8.7 | 6.1 | trimethoxysilane | 18.4 |
| 2 | polyethylene glycol monomethyl ether (n = 10) | 28.3 | sodium hydride | 2.9 | THF | 200 | allyl bromide | 8.7 | 6.1 | triethoxysilane | 23.4 |
| 3 | polyethylene glycol monomethyl ether (n = 6) | 17.8 | sodium hydride | 2.9 | THF | 200 | allyl bromide | 8.7 | 4.0 | trimethoxysilane | 18.4 |
| 4 | polyethylene glycol monomethyl ether (n = 24) | 49.5 | sodium hydride | 2.9 | THF | 200 | allyl bromide | 8.7 | 13.5 | trimethoxysilane | 18.4 |
| 5 (comparative) | glycidol | 4.4 | sodium hydride | 2.9 | THF | 200 | allyl bromide | 8.7 | 1.7 | trimethoxysilane | 18.4 |

TABLE 3

Structure of synthesized compound represented by formula (1)

| Compound | X | $R_1$ | $R_2$ | $R_3$ | R4 | n | a | b | Compound name |
| --- | --- | --- | --- | --- | --- | --- | --- | --- | --- |
| 1 | n-propylene group | methyl group | — | methyl group | ethylene group | 10 | 3 | 0 | 3-(methoxy(oxyethylene10)) propyltrimethoxysilane |
| 2 | n-propylene group | ethyl group | — | methyl group | ethylene group | 10 | 3 | 0 | 3-(methoxy(oxyethylene10)) propyltriethoxysilane |
| 3 | n-propylene group | methyl group | — | methyl group | ethylene group | 6 | 3 | 0 | 3-(methoxy(oxyethylene6)) propyltrimethoxysilane |
| 4 | n-propylene group | methyl group | — | methyl group | ethylene group | 24 | 3 | 0 | 3-(methoxy(oxyethylene24)) propyltrimethoxysilane |
| 5 (comparative) | n-propylene group | methyl group | — | glycidyl group | methylene group | 1 | 3 | 0 | 3-glycidyloxy- propyltrimethoxysilane | prepare each pigment dispersion having a titanium oxide particle content of 40.00%. In Table 4, "aqueous solution of water-soluble resin" of pigment dispersion 14 was synthesized by a method described below, and the water-soluble resin content was 40.00%. The poly(acrylic acid) of pigment dispersion 18 was synthesized by a method described below, had a weight-average molecular weight of 5,000 and was a potassium salt type.

Pigment Dispersion 15

A pigment dispersion was prepared according to a method for preparing a pigment 3k in Example 3 of PCT Japanese Translation Patent Publication No. 2017-521348. Specifically, the pigment dispersion was prepared according to the method for producing the pigment dispersion 10 described above. The resulting pigment dispersion was dried by air blowing at 35° C. under stirring to remove water, and then dried in an oven at 105° C. for 4 hours and 15 minutes to obtain a titanium oxide particle powder. The titanium oxide particle powder was re-dispersed in an appropriate amount of ion-exchanged water to prepare pigment dispersion 15 having a titanium oxide particle content of 40.00%.

TABLE 4

Production conditions of pigment dispersion

| Pigment dispersion | Titanium oxide particle | Dispersant Compound | Amount used (parts) |
|---|---|---|---|
| 1 | 1 | 1 | 1.20 |
| 2 | 2 | 1 | 1.20 |
| 3 | 3 | 1 | 1.20 |
| 4 | 4 | 1 | 1.20 |
| 5 | 1 | — | 0.00 |
| 6 | 1 | 2 | 1.20 |
| 7 | 1 | 3 | 1.20 |
| 8 | 1 | 4 | 1.20 |
| 9 | 1 | 5 (comparative) | 1.20 |
| 10 | 5 | 1 | 1.20 |
| 11 | 6 | 1 | 1.20 |
| 12 | 7 | 1 | 1.20 |
| 13 | 8 | 1 | 1.20 |
| 14 | 1 | aqueous solution of water-soluble resin | 13.30 |
| 15 | 5 | 1 | 1.20 |
| 16 | 9 | — | 0.00 |
| 17 | 10 | — | 0.00 |
| 18 | 1 | poly(acrylic acid) | 8.00 |

Synthesis of Resin Particle

In a four-necked flask equipped with a stirrer, a reflux condenser and a nitrogen gas inlet, 0.2 parts of potassium persulfate and 74.0 parts of ion-exchanged water were placed. Nitrogen gas was then introduced thereinto. Monomers given in Table 5 and 0.3 parts of an emulsifier (trade name: "NIKKOL BC15", available from Nikko Chemicals Co., Ltd.) were mixed to prepare a mixture. The resulting mixture was added dropwise to the four-necked flask under stirring over 1 hour, and then reacted at 80° C. for 2 hours. The reaction mixture was cooled to 25° C. Potassium hydroxide in an amount, by mole, equivalent to the acid value of the resin and an appropriate amount of ion-exchanged water were added to the reaction mixture to prepare aqueous dispersion of polymer particle 1 to 4 having a resin particle content of 40.0% and a 50% cumulative particle size of 100 nm on a volume basis. Table 5 presents the acid value of the resin particle. The volume of the resin particle was calculated by dividing the resin particle content (% by mass) of the ink by the specific gravity given in Table 5. The specific gravity of the resin particle is a value measured by subjecting an aqueous dispersion of the resin particle to a density gradient centrifugation method. Details of each component in Table 5 are described below.

BMA: Butyl methacrylate
MAA: Methacrylic acid

TABLE 5

Synthesis conditions and properties of resin particle

| Resin particle | Monomer (parts) BMA | MAA | Acid value (mgKOH/g) | Specific gravity |
|---|---|---|---|---|
| 1 | 97.8 | 2.2 | 14.3 | 1.20 |
| 2 | 99.9 | 0.1 | 4.6 | 1.20 |
| 3 | 96.5 | 3.5 | 23.4 | 1.20 |
| 4 | 95.6 | 4.4 | 28.7 | 1.20 |

Synthesis of Water-Soluble Resin

A water-soluble acrylic resin was synthesized by polymerizing 81.6 parts of butyl methacrylate and 18.4 parts of methacrylic acid in the usual manner. Ion-exchanged water containing potassium hydroxide in an amount, by mole, equivalent to the acid value was added to neutralize the acid groups, and then an appropriate amount of water was further added to prepare an aqueous solution of a water-soluble resin having a resin content of 40.0%. The acid value of this water-soluble resin was 120.0 mgKOH/g.

Synthesis of Poly(Acrylic Acid)

Acrylic acid was polymerized in the usual manner to synthesize a poly(acrylic acid). The weight-average molecular weight was adjusted by adjusting the heating temperature and time during the polymerization. The carboxylic acid groups were converted into sodium salt, lithium salt, potassium salt and ammonium salt forms with sodium hydroxide, lithium hydroxide, potassium hydroxide and ammonia used in amounts, by mole, equivalent to the acid values.

Preparation of Alumina Particle-Containing Liquid

An alumina particle-containing liquid was prepared by the following method. Specifically, an alumina particle dispersion containing an amphoteric alumina particle (trade name: "Dispal 23N4-80", dispersion particle diameter: 90 nm, available from Sasol) in an amount of 10% was provided. The pH of the alumina particle dispersion was adjusted to 4.0 with a strong acid (1 mol/L hydrochloric acid). The alumina particle dispersion was mixed using a propeller mixer until it became uniform, and pulverized with a bead mill to prepare a alumina particle-containing liquid (alumina particle content: 10%).

Preparation of Ink

Components of the types and amounts given in the upper rows of Tables 6 to 9 were mixed and stirred. Acetylenol E60 (trade name) is a nonionic surfactant available from Kawaken Fine Chemicals Co., Ltd. PVP/VA 735 (trade name) is a vinyl acetate-vinyl pyrrolidone copolymer available from Ashland Japan Ltd. The weight-average molecular weight and the type of salt of the poly(acrylic acid) are collectively described. For example, the description "poly (acrylic acid) (Mw: 1,500, Na salt)" indicates that the weight-average molecular weight is 1,500 and the poly (acrylic acid) is in a sodium salt form. Thereafter, pressure filtration was performed with a membrane filter (available from Sartorius) having a pore size of 5.0 μm to prepare each ink.

Calculation of Ink Viscosity

The viscosity of each ink was measured with a rotational shear rheometer (trade name: "DHR-20", available from TA Instruments) using a cone plate having a plate diameter of 60 mm and a cone angle of 1°. The measurement conditions are described below.

Temperature: 25° C.
Soak time: 10 seconds
Initial sear rate: 0.01 (1/s) 1,000 (1/s)
Points per decade: 20

Calculation of Total Monovalent Cation Content of Ink

The total monovalent cation content of the ink was measured by ICP optical emission spectrometry. Specifically, each of the prepared inks was diluted with ion-exchanged water so as to have a pigment content of 0.04%. The amounts of various monovalent cations contained in the ink were quantified with an ICP optical emission spectrometer (trade name: "SPS5100 ICP-OES", available from SII). Among the monovalent cations, the ammonium ion concentration was measured with an ion chromatograph (trade name: "DX-320", available from Dionex). Then, the total monovalent cation content (ppm) in the case of the titanium oxide particle content of the ink before dilution was calculated from the quantified monovalent cation content. Tables 6 to 9 collectively present the properties of each ink and the total monovalent cation content in the lower sections. In Tables 6 to 9, the "Volume of particle" is the total volume of the compounds, such as the titanium oxide particle and the resin particle, dispersed in the ink without being dissolved in the liquid medium in the ink and was calculated by the above-described method. In the case of the ink prepared from the pigment dispersion using the titanium oxide particle whose surface was at least partially covered with at least silica, the section of "Contribution of silica to dispersion of titanium oxide particle" was expressed as "yes". However, when the ink contains 0.01% by mass or more of the water-soluble resin particle other than poly(acrylic acid), the dispersion owing to the action of silica is considered to be unstable. As in Comparative example 13, when a poly(acrylic acid) having a high molecular weight is excessively contained, the dispersion owing to the action of silica is considered to be unstable as in the case of other water-soluble resins. Thus, the ink as described above was expressed as "no" in the section of "Contribution of silica to dispersion of titanium oxide particle".

TABLE 6

Composition and properties of ink

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Type of pigment dispersion | 1 | 2 | 1 | 3 | 4 | 1 | 2 | 1 | 1 | 1 | 1 |
| Pigment dispersion | 37.50 | 37.50 | 37.50 | 37.50 | 37.50 | 25.00 | 20.00 | 37.50 | 37.50 | 25.00 | 37.50 |
| Compound 1 | | | | | | | | | | | |
| PVPNA735W | | | | | | | | | | | |
| Aqueous solution of water-soluble resin | | | | | | | | | | | |
| Aqueous dispersion of resin particle 1 | 25.00 | 25.00 | 28.00 | 25.00 | 25.00 | 25.00 | 30.00 | 25.00 | 25.00 | 0.50 | 29.30 |
| Aqueous dispersion of resin particle 2 | | | | | | | | | | | |
| Aqueous dispersion of resin particle 3 | | | | | | | | | | | |
| Aqueous dispersion of resin particle 4 | | | | | | | | | | | |
| Poly(acrylic acid) (Mw: 1,500, Na salt) | | | | | | | | | | | |
| Poly(acrylic acid) (Mw: 2,000, Na salt) | 0.05 | 0.05 | 0.05 | 0.05 | 0.05 | 0.05 | 0.05 | | | 0.05 | 0.05 |
| Poly(acrylic acid) (Mw: 2,000, Li salt) | | | | | | | | 0.05 | | | |
| Poly(acrylic acid) (Mw: 2,000, NH4 salt) | | | | | | | | | 0.05 | | |
| Poly(acrylic acid) (Mw: 2,500, Na salt) | | | | | | | | | | | |
| Poly(acrylic acid) (Mw: 3,000, Na salt) | | | | | | | | | | | |
| Poly(acrylic acid) (Mw: 3,500, Na salt) | | | | | | | | | | | |
| 1,2-Propanediol | 15.00 | 15.00 | 17.00 | 15.00 | 15.00 | 15.00 | 15.00 | 15.00 | 15.00 | 15.00 | 17.00 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 |
| Alumina particle-containing liquid | | | | | | | | | | | |
| Ion-exchanged water | 18.55 | 18.55 | 13.55 | 18.55 | 18.55 | 31.05 | 31.05 | 18.55 | 18.55 | 55.55 | 12.25 |
| Viscosity $\eta_1$ (mPa · s) at 1 (1/s) | 4.9 | 4.9 | 4.9 | 4.9 | 4.9 | 3.8 | 4.4 | 4.9 | 4.9 | 2.5 | 4.9 |
| Viscosity $\eta_{1,000}$ (mPa · s) at 1,000 (1/s) | 4.6 | 4.6 | 4.6 | 4.6 | 4.6 | 3.6 | 4.0 | 4.6 | 4.6 | 2.4 | 4.6 |
| Value of $\eta_1/\eta_{1,000}$ (times) | 1.07 | 1.07 | 1.07 | 1.07 | 1.07 | 1.06 | 1.10 | 1.07 | 1.07 | 1.04 | 1.07 |
| Volume of particle (%) | 12.1 | 12.1 | 13.1 | 12.1 | 12.1 | 10.8 | 12.0 | 12.1 | 12.1 | 2.7 | 13.5 |
| Titanium oxide particle content T (%) | 15.00 | 15.00 | 15.00 | 15.00 | 15.00 | 10.00 | 8.00 | 15.00 | 15.00 | 10.00 | 15.00 |
| Poly(acrylic acid) content A (%) | 0.05 | 0.05 | 0.05 | 0.05 | 0.05 | 0.05 | 0.05 | 0.05 | 0.05 | 0.05 | 0.05 |
| Value of A/T (times) | 0.003 | 0.003 | 0.003 | 0.003 | 0.003 | 0.005 | 0.006 | 0.003 | 0.003 | 0.005 | 0.003 |
| Total monovalent cation content (ppm) | 1,155 | 1,006 | 1,215 | 1,285 | 951 | 963 | 907 | 1,155 | 1,155 | 472 | 1,241 |
| Contribution of silica to dispersion of titanium oxide particle | yes | yes | yes | yes | yes | yes | yes | yes | yes | yes | yes |

TABLE 7

Composition and properties of ink

| | Example | | | | | | | | | |
|---|---|---|---|---|---|---|---|---|---|---|
| | 12 | 13 | 14 | 15 | 16 | 17 | 18 | 19 | 20 | 21 |
| Type of pigment dispersion | 1 | 1 | 1 | 1 | 1 | 1 | 1 | 2 | 2 | 2 |
| Pigment dispersion | 37.50 | 37.50 | 50.00 | 37.50 | 37.50 | 37.50 | 37.50 | 37.50 | 37.50 | 37.50 |
| Compound 1 | | | | | | | | | | |
| PVPNA735W | | | | | | | | | | |
| Aqueous solution of water-soluble resin | | | | | | | | | | |
| Aqueous dispersion of resin particle 1 | 30.00 | 25.00 | | 25.00 | 25.00 | 25.00 | 25.00 | 25.00 | 25.00 | |
| Aqueous dispersion of resin particle 2 | | | | | | | | | | 25.00 |
| Aqueous dispersion of resin particle 3 | | | | | | | | | | |
| Aqueous dispersion of resin particle 4 | | | | | | | | | | |
| Poly(acrylic acid) (Mw: 1,500, Na salt) | | | | 0.07 | | | | | | |
| Poly (acrylic acid) (Mw: 2,000, Na salt) | 0.05 | | | | | | 0.02 | 0.14 | 0.19 | 0.05 |
| Poly(acrylic acid) (Mw: 2,000, Li salt) | | | | | | | | | | |
| Poly (acrylic acid) (Mw: 2,000, $NH_4$ salt) | | | | | | | | | | |
| Poly (acrylic acid) (Mw: 2,500, Na salt) | | | | | 0.07 | | | | | |
| Poly (acrylic acid) (Mw: 3,000, Na salt) | | | | | | 0.07 | | | | |
| Poly (acrylic acid) (Mw: 3,500, Na salt) | | | | | | | | | | |
| 1,2-Propanediol | 17.00 | 15.00 | 15.00 | 15.00 | 15.00 | 15.00 | 15.00 | 15.00 | 15.00 | 15.00 |
| 2-Pyrrolidone | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 |
| Alumina particle-containing liquid | | | | | | | | | | |
| Ion-exchanged water | 11.55 | 18.60 | 31.10 | 18.53 | 18.53 | 18.53 | 18.58 | 18.46 | 18.41 | 18.55 |
| Viscosity $\eta_1$ (mPa·s) at 1 (1/s) | 5.5 | 5.0 | 3.4 | 4.9 | 4.9 | 4.9 | 4.9 | 4.9 | 5.0 | 4.6 |
| Viscosity $\eta_{1,000}$ (mPa·s) at 1,000 (1/s) | 5.1 | 4.6 | 3.3 | 4.6 | 4.6 | 4.6 | 4.6 | 4.6 | 4.7 | 4.4 |
| Value of $\eta_1/\eta_{1,000}$ (times) | 1.08 | 1.09 | 1.03 | 1.07 | 1.07 | 1.07 | 1.07 | 1.07 | 1.06 | 1.05 |
| Volume of particle (%) | 13.8 | 12.1 | 5.0 | 12.1 | 12.1 | 12.1 | 12.1 | 12.1 | 12.1 | 12.1 |
| Titanium oxide particle content T (%) | 15.00 | 15.00 | 20.00 | 15.00 | 15.00 | 15.00 | 15.00 | 15.00 | 15.00 | 15.00 |
| Poly (acrylic acid) content A (%) | 0.05 | 0.00 | 0.00 | 0.07 | 0.07 | 0.07 | 0.02 | 0.14 | 0.19 | 0.05 |
| Value of A/T (times) | 0.003 | 0.000 | 0.000 | 0.005 | 0.005 | 0.005 | 0.001 | 0.010 | 0.013 | 0.003 |
| Total monovalent cation content (ppm) | 1,255 | 1,077 | 768 | 1,190 | 1,190 | 1,190 | 1,109 | 1,162 | 1,240 | 533 |
| Contribution of silica to dispersion of titanium oxide particle | yes | yes | yes | yes | yes | yes | yes | yes | yes | yes |

TABLE 8

Composition and proerties of ink

| | Example | | | | | | | | Comparative example | |
|---|---|---|---|---|---|---|---|---|---|---|
| | 22 | 23 | 24 | 25 | 26 | 27 | 28 | 29 | 1 | 2 |
| Type of pigment dispersion | 2 | 1 | 5 | 6 | 7 | 8 | 9 | 5 | 10 | 11 |
| Pigment dispersion | 37.50 | 37.50 | 37.50 | 37.50 | 37.50 | 37.50 | 37.50 | 37.50 | 37.50 | 37.50 |
| Compound 1 | | | | | | | | | | |
| PVPNA735W | | | | | | | | | | |
| Aqueous solution of water-soluble resin | | | | | | | | | | |
| Aqueous dispersion of resin particle 1 | | | 25.00 | 25.00 | 25.00 | 25.00 | 25.00 | | | |
| Aqueous dispersion of resin particle 2 | | | | | | | | | | |
| Aqueous dispersion of resin particle 3 | 25.00 | | | | | | | | 25.00 | 20.00 |
| Aqueous dispersion of resin particle 4 | | 25.00 | | | | | | 30.00 | | |
| Poly(acrylic acid) (Mw: 1,500, Na salt) | | | | | | | | | | |
| Poly(acrylic acid) (Mw: 2,000, Na salt) | 0.05 | 0.05 | 0.05 | 0.05 | 0.05 | 0.05 | 0.05 | | 0.05 | 0.05 |
| Poly(acrylic acid) (Mw: 2,000, Li salt) | | | | | | | | | | |
| Poly(acrylic acid) (Mw: 2,000, $NH_4$ salt) | | | | | | | | | | |
| Poly(acrylic acid) (Mw: 2,500, Na salt) | | | | | | | | | | |
| Poly(acrylic acid) (Mw: 3,000, Na salt) | | | | | | | | | | |
| Poly(acrylic acid) (Mw: 3,500, Na salt) | | | | | | | | | | |
| 1,2-Propanediol | 15.00 | 15.00 | 15.00 | 15.00 | 15.00 | 15.00 | 15.00 | 17.00 | 15.00 | 15.00 |
| 2-Pyrrolidone | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 |
| Alumina particle-containing liquid | | | | | | | | | | |
| Ion-exchanged water | 18.55 | 18.55 | 18.55 | 18.55 | 18.55 | 18.55 | 18.55 | 11.60 | 18.55 | 23.55 |
| Viscosity $\eta_1$ (mPa·s) at 1 (1/s) | 3.9 | 4.0 | 4.9 | 4.9 | 4.9 | 4.9 | 4.9 | 5.1 | 5.8 | 4.9 |
| Viscosity $\eta_{1,000}$ (mPa·s) at 1,000 (1/s) | 3.6 | 3.6 | 4.6 | 4.6 | 4.6 | 4.6 | 4.6 | 4.7 | 5.6 | 4.6 |
| Value of $\eta_1/\eta_{1,000}$ (times) | 1.08 | 1.10 | 1.07 | 1.07 | 1.07 | 1.07 | 1.07 | 1.09 | 1.04 | 1.07 |
| Volume of particle (%) | 12.1 | 12.1 | 12.1 | 12.1 | 12.1 | 12.1 | 12.1 | 13.8 | 12.1 | 10.4 |
| Titanium oxide particle content T (%) | 15.00 | 15.00 | 15.00 | 15.00 | 15.00 | 15.00 | 15.00 | 15.00 | 15.00 | 15.00 |
| Poly (acrylic acid) content A (%) | 0.05 | 0.05 | 0.05 | 0.05 | 0.05 | 0.05 | 0.05 | 0.00 | 0.05 | 0.05 |

TABLE 8-continued

Composition and proerties of ink

| | Example | | | | | | | | Comparative example | |
| --- | --- | --- | --- | --- | --- | --- | --- | --- | --- | --- |
| | 22 | 23 | 24 | 25 | 26 | 27 | 28 | 29 | 1 | 2 |
| Value of A/T (times) | 0.003 | 0.003 | 0.003 | 0.003 | 0.003 | 0.003 | 0.003 | 0.000 | 0.003 | 0.003 |
| Total monovalent cation content (PPm) | 1,300 | 1,654 | 1,155 | 1,155 | 1,155 | 1,155 | 1,155 | 1,776 | 1,155 | 1,438 |
| Contribution of silica to dispersion of titanium oxide particle | yes | yes | yes | yes | yes | yes | yes | yes | yes | yes |

TABLE 9

Composition and properties of ink

| | Comparative example | | | | | | | | | | |
| --- | --- | --- | --- | --- | --- | --- | --- | --- | --- | --- | --- |
| | 3 | 4 | 5 | 6 | 7 | 8 | 9 | 10 | 11 | 12 | 13 |
| Type of pigment dispersion | 12 | 13 | 14 | 14 | 1 | 12 | 2 | 15 | 16 | 17 | 18 |
| Pigment dispersion | 37.50 | 37.50 | 37.50 | 37.50 | 37.50 | 37.50 | 50.00 | 37.50 | 41.25 | 30.00 | 25.00 |
| Compound 1 | | | | 0.45 | | | | | | | |
| PVPNA735W | | | | | | | | | 1.00 | | |
| Aqueous solution of water-soluble resin | | | | | 5.00 | 5.00 | | | | | |
| Aqueous dispersion of resin particle 1 | | | | | 25.00 | | 25.00 | 25.00 | | 27.00 | 25.00 |
| Aqueous dispersion of resin particle 2 | | | 25.00 | 25.00 | | | | | | | |
| Aqueous dispersion of resin particle 3 | 25.00 | 25.00 | | | | 25.00 | | | | | |
| Aqueous dispersion of resin particle 4 | | | | | | | | | | | |
| Poly(acrylic acid) (Mw: 1,500, Na salt) | | | | | | | | | | | |
| Poly(acrylic acid) (Mw: 2,000, Na salt) | 0.05 | 0.05 | 0.05 | 0.05 | 0.05 | 0.05 | | | | | |
| Poly(acrylic acid) (Mw: 2,000, Li salt) | | | | | | | | | | | |
| Poly(acrylic acid) (Mw: 2,000, NH$_4$ salt) | | | | | | | | | | | |
| Poly(acrylic acid) (Mw: 2,500, Na salt) | | | | | | | | | | | |
| Poly(acrylic acid) (Mw: 3,000, Na salt) | | | | | | | | | | | |
| Poly(acrylic acid) (Mw: 3,500, Na salt) | | | | | | | | | | 0.10 | |
| 1,2-Propanediol | 15.00 | 15.00 | 15.00 | 15.00 | 15.00 | 15.00 | 20.00 | 15.00 | 27.28 | 17.30 | 15.00 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | | | 0.90 |
| Alumina particle-containing liquid | | | | | | | | | | 1.55 | |
| Ion-exchanged water | 18.55 | 18.55 | 18.55 | 18.10 | 13.55 | 13.55 | 1.10 | 18.60 | 27.37 | 21.15 | 31.10 |
| Viscosity $\eta_1$ (mPa · s) at 1 (1/s) | 4.9 | 6.3 | 5.6 | 5.6 | 6.5 | 6.5 | 6.6 | 4.7 | 10.0 | 6.2 | 6.2 |
| Viscosity $\eta_{1,000}$ (mPa · s) at 1,000 (1/s) | 4.6 | 5.2 | 5.5 | 5.6 | 6.5 | 6.5 | 5.8 | 4.6 | more than 2,000 | 4.6 | 6.2 |
| Value of $\eta_1/\eta_{1,000}$ (times) | 1.07 | 1.21 | 1.02 | 1.00 | 1.00 | 1.00 | 1.14 | 1.02 | — | 1.35 | 1.00 |
| Volume of particle (%) | 12.1 | 12.0 | 12.1 | 12.1 | 12.1 | 12.1 | 13.3 | 12.1 | 4.1 | 11.9 | 10.8 |
| Titanium oxide particle content T (%) | 15.00 | 15.00 | 15.00 | 15.00 | 15.00 | 15.00 | 20.00 | 15.00 | 16.50 | 12.00 | 10.00 |
| Poly(acrylic acid) content A (%) | 0.05 | 0.05 | 0.05 | 0.05 | 0.05 | 0.05 | 0.00 | 0.00 | 0.10 | 0.00 | 0.00 |
| Value of A/T (times) | 0.003 | 0.003 | 0.003 | 0.003 | 0.003 | 0.003 | 0.000 | 0.000 | 0.006 | 0.000 | 0.000 |
| Total monovalent cation content (ppm) | 1,245 | 873 | 1,510 | 1,510 | 1,993 | 2,083 | 1,071 | 1,226 | 299 | 541 | 4,125 |
| Contribution of silica to dispersion of titanium oxide particle | yes | no | no | no | no | no | yes | yes | yes | no | no |

Evaluation

Each ink obtained above was evaluated for the following items. In Examples of the present disclosure, "AA", "A" and "B" were defined as acceptable levels, and "C" and "D" were defined as unacceptable levels in the evaluation criteria for an item described below. The inks of Comparative examples 10 and 11 were not able to be ejected with an ink jet recording apparatus. The evaluation result sections of these inks were expressed as "not ejectable". Table 10 presents the evaluation results.

Leveling Property

Each ink prepared as described above was filled into an ink cartridge. The ink cartridge was set in an ink jet recording apparatus (trade name: "PIXUS PRO-10S", available from CANON KABUSHIKI KAISHA) equipped with a recording head that ejects the ink by thermal energy. In Examples, the recording duty of a solid image recorded under the condition that four ink droplets of about 3.8 ng are applied to a unit region of 1/600 inch×1/600 inch in such a manner that the dot application positions do not overlap at 1,200 dpi is defined as 100%. Four types of solid images of 16.2 mm×16.2 mm having recording duties of 40%, 80%, 120% and 160% were recorded on a PET film (trade name: "Ultra-transparent PET film GIY-0305", available from Lintec Corporation) using the ink jet recording apparatus described above. At this time, the application of the ink to the unit region was performed 16 times (16-pass recording) while reciprocating the recording head in the main scanning direction, so that the dots were less likely to come into contact with each other in a liquid state. The state of the surface of the recorded solid image (whether or not the contour of the ink dot remained and the surface was roughened) was visually checked. The leveling property was evaluated according to the following evaluation criteria. At a lower recording duty, the ink dots are less likely to come into contact with each other in a liquid state. Thus, even in an image having a low recording duty, when the surface is smooth and not rough, it means that the leveling property is excellent.

AA: The surface was not rough in the solid image of any recording duty.

A: In the solid image with a recording duty of 40%, the outlines of the ink dots were observed to be left, and the surface was rough. However, in the solid images with recording duties of 80%, 120% and 160%, the surfaces were not rough.

B: In the solid images with recording duties of 40% and 80%, the outlines of the ink dots were observed to be left, and the surfaces were rough. However, in the solid images with recording duties of 120% and 160%, the surfaces were not rough.

C: In the solid images with recording duties of 40%, 80% and 120%, the outlines of the ink dots were observed to be left, and the surfaces were rough. However, in the solid images with a recording duty of 160%, the surface was not rough.

D: In the solid images of any recording duty, the outlines of the ink dots were observed to be left, and the surface was rough.

TABLE 10

Evaluation results

|  |  | Leveling property |
|---|---|---|
| Example | 1 | AA |
|  | 2 | AA |
|  | 3 | AA |
|  | 4 | AA |
|  | 5 | AA |
|  | 6 | AA |
|  | 7 | AA |
|  | 8 | AA |
|  | 9 | AA |
|  | 10 | AA |
|  | 11 | AA |
|  | 12 | A |
|  | 13 | A |
|  | 14 | A |
|  | 15 | AA |
|  | 16 | AA |
|  | 17 | A |
|  | 18 | AA |
|  | 19 | AA |
|  | 20 | A |
|  | 21 | AA |
|  | 22 | AA |
|  | 23 | A |
|  | 24 | A |
|  | 25 | AA |
|  | 26 | AA |
|  | 27 | AA |

TABLE 10-continued

Evaluation results

|  |  | Leveling property |
|---|---|---|
|  | 28 | A |
|  | 29 | B |
| Comparative example | 1 | C |
|  | 2 | C |
|  | 3 | C |
|  | 4 | D |
|  | 5 | C |
|  | 6 | C |
|  | 7 | D |
|  | 8 | C |
|  | 9 | C |
|  | 10 | not ejectable |
|  | 11 | not ejectable |
|  | 12 | D |
|  | 13 | D |

According to an embodiment of the present disclosure, it is possible to provide a titanium oxide-containing aqueous ink used for ink jet recording being capable of recording an image with a superior leveling property, an ink cartridge using the aqueous ink, and an ink jet recording method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-165008 filed Oct. 6, 2021 and No. 2022-145604 filed Sep. 13, 2022, which are hereby incorporated by reference herein in their entirety.

What is claimed is:

1. An aqueous ink for ink jet recording, comprising:
    a titanium oxide particle containing titanium oxide, at least part of a surface of the titanium oxide being covered with alumina and silica,
    wherein the titanium oxide particle is dispersed at least by an action of the silica,
    a proportion of the alumina in the titanium oxide particle is 0.50 times or more to 1.00 time or less a proportion of the silica in the titanium oxide particle in terms of a mass ratio, and
    a ratio ($\eta_1/\eta_{1,000}$) of a viscosity ($\eta_1$) of the aqueous ink at a shear rate of 1 (1/s) to a viscosity ($\eta_{1,000}$) at a shear rate of 1,000 (1/s) is 1.10 times or less.

2. The aqueous ink according to claim 1, wherein a proportion of the titanium oxide in the titanium oxide particle is 90.00% by mass or more based on a total mass of the titanium oxide particle.

3. The aqueous ink according to claim 1, wherein a proportion of the titanium oxide in the titanium oxide particle is 98.50% by mass or less based on a total mass of the titanium oxide particle.

4. The aqueous ink according to claim 1, wherein a proportion of the alumina in the titanium oxide particle is 0.50% by mass or more to 4.00% by mass or less based on a total mass of the titanium oxide particle.

5. The aqueous ink according to claim 1, wherein a proportion of the silica in the titanium oxide particle is 1.00% by mass or more to 4.00% by mass or less based on a total mass of the titanium oxide particle.

6. The aqueous ink according to claim 1, wherein a ratio ($\eta_1/\eta_{1,000}$) of a viscosity ($\eta_1$) of the aqueous ink at a shear rate of 1 (1/s) to a viscosity ($\eta_{1,000}$) at a shear rate of 1,000 (1/s) is 1.00 time or more.

7. The aqueous ink according to claim 1, wherein a viscosity ($\eta_1$) of the aqueous ink at a shear rate of 1 (1/s) is 1.0 mPa·s or more to 10.0 mPa·s or less.

8. The aqueous ink according to claim 1, wherein a viscosity ($\eta_{1,000}$) of the aqueous ink at a shear rate of 1,000 (1/s) is 1.0 mPa·s or more to 15.0 mPa·s or less.

9. The aqueous ink according to claim 1, wherein a volume of a particle including the titanium oxide particle dispersed in the aqueous ink is 13.5% by volume or less based on a total volume of the ink.

10. The aqueous ink according to claim 1, wherein a volume of a particle including the titanium oxide particle dispersed in the aqueous ink is 2.5% by volume or more based on a total volume of the ink.

11. The aqueous ink according to claim 1, further comprising a monovalent cation,
wherein a total monovalent cation content of the aqueous ink is 1,300 ppm or less based on a total mass of the ink.

12. The aqueous ink according to claim 1, further comprising a monovalent cation,
wherein a total monovalent cation content of the aqueous ink is 500 ppm or more based on a total mass of the ink.

13. The aqueous ink according to claim 1, further comprising a poly(acrylic acid) having a weight-average molecular weight of 2,500 or less, wherein an amount of the poly(acrylic acid) contained in the aqueous ink is 0.010 times or less an amount of the titanium oxide particle contained in the aqueous ink in terms of a mass ratio.

14. The aqueous ink according to claim 13, wherein the poly(acrylic acid) has a weight-average molecular weight of 1,500 or more.

15. The aqueous ink according to claim 13, wherein the amount of the poly(acrylic acid) contained in the aqueous ink is 0.001 times or more the amount of the titanium oxide particle contained in the aqueous ink in terms of a mass ratio.

16. The aqueous ink according to claim 1, further comprising a compound represented by the following formula (1):

where in formula (1), $R_1$, $R_2$ and $R_3$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

17. An ink cartridge comprising an ink; and an ink storage portion storing the ink,
wherein the ink comprises the aqueous ink according to claim 1.

18. An ink jet recording method of recording an image onto a recording medium by ejecting an ink from an ink jet recording head,
wherein the ink comprises the aqueous ink according to claim 1.

19. An aqueous ink for ink jet recording, comprising:
a titanium oxide particle containing titanium oxide, at least part of a surface of the titanium oxide being covered with alumina and silica,
wherein the titanium oxide particle is dispersed at least by an action of the silica,
a proportion of an aluminum element in the titanium oxide particle is 0.57 times or more to 1.13 times or less a proportion of a silicon element in the titanium oxide particle in terms of a mass ratio, the proportions being obtained by inductively coupled plasma-optical emission spectrometry, and
a ratio ($\eta_1/\eta_{1,000}$) of a viscosity ($\eta_1$) of the aqueous ink at a shear rate of 1 (1/s) to a viscosity ($\eta_{1,000}$) at a shear rate of 1,000 (1/s) is 1.10 times or less.

* * * * *